United States Patent [19]
Stall

[11] Patent Number: 6,086,929
[45] Date of Patent: Jul. 11, 2000

[54] SHIRRING SOLUTION FOR CELLULOSIC SAUSAGE CASINGS

[75] Inventor: Alan David Stall, Naperville, Ill.

[73] Assignee: Alfacel s.a., Madrid, Spain

[21] Appl. No.: 09/153,314

[22] Filed: Sep. 15, 1998

[51] Int. Cl.$^7$ ............................ A22C 11/00; A22C 13/02
[52] U.S. Cl. ......................... 426/92; 426/105; 426/135; 426/389; 426/414
[58] Field of Search .................... 426/105, 276, 426/277, 389, 414, 92, 13 S

[56] References Cited

U.S. PATENT DOCUMENTS

| | | | |
|---|---|---|---|
| 2,181,329 | 11/1939 | Hewitt | 99/271 |
| 2,709,138 | 5/1955 | Weingaud et al. | 99/176 |
| 2,794,544 | 6/1957 | Firth | 206/46 |
| 2,840,474 | 6/1958 | Wirt et al. | 99/166 |
| 2,866,710 | 12/1958 | Dowd et al. | 99/176 |
| 2,873,715 | 2/1959 | Signer | 118/34 |
| 2,982,660 | 5/1961 | Brissey et al. | 99/174 |
| 2,983,949 | 5/1961 | Matecki | 17/42 |
| 3,028,952 | 4/1962 | Milio et al. | 206/46 |
| 3,097,393 | 7/1963 | Matecki | 17/45 |
| 3,110,058 | 11/1963 | Marbach | 17/42 |
| 3,158,488 | 11/1964 | Firth | 99/109 |
| 3,158,896 | 12/1964 | Marbach | 17/45 |
| 3,222,192 | 12/1965 | Arnold et al. | 99/176 |
| 3,250,629 | 5/1966 | Turbak | 99/176 |
| 3,262,789 | 7/1966 | Hormoz et al. | 99/229 |
| 3,266,911 | 8/1966 | Clement | 99/176 |
| 3,307,956 | 3/1967 | Chiu et al. | 99/176 |
| 3,442,663 | 5/1969 | Turbak | 99/176 |
| 3,451,827 | 6/1969 | Bridgeford | 99/176 |
| 3,456,286 | 7/1969 | Martinek | 17/49 |
| 3,462,794 | 8/1969 | Martinek | 17/42 |
| 3,558,331 | 1/1971 | Tarika | 99/176 |
| 3,594,856 | 7/1971 | Michl et al. | 17/42 |
| 3,616,489 | 11/1971 | Voo et al. | 17/42 |
| 3,653,928 | 4/1972 | Rose et al. | 99/176 |
| 3,658,560 | 4/1972 | Rose et al. | 99/176 |
| 3,658,561 | 4/1972 | Rose et al. | 99/176 |
| 3,674,511 | 7/1972 | Rose et al. | 99/176 |
| 3,695,901 | 10/1972 | Winokur | 99/176 |
| 3,753,740 | 8/1973 | Turbak et al. | 99/176 |
| 3,798,301 | 3/1974 | Rassbach et al. | 264/294 |
| 3,805,330 | 4/1974 | Martinek | 17/49 |
| 3,818,947 | 6/1974 | Rose | 138/118.1 |
| 3,834,920 | 9/1974 | Rose | 106/267 |
| 3,898,348 | 8/1975 | Chiu et al. | 426/413 |
| 3,909,882 | 10/1975 | Winokur | 17/42 |
| 3,922,398 | 11/1975 | Bridgeford et al. | 427/259 |
| 3,981,046 | 9/1976 | Chiu | 17/49 |
| 4,062,980 | 12/1977 | Wilson et al. | 426/278 |
| 4,062,981 | 12/1977 | Bridgeford | 426/278 |
| 4,137,947 | 2/1979 | Bridgeford | 138/118.1 |
| 4,248,900 | 2/1981 | Hammer et al. | 426/105 |
| 4,489,114 | 12/1984 | Bridgeford | 428/36 |
| 4,528,225 | 7/1985 | Hutschenreuter et al. | 428/36 |
| 4,543,282 | 9/1985 | Hammer et al. | 428/36 |
| 4,563,376 | 1/1986 | Hammer et al. | 428/36 |
| 4,596,727 | 6/1986 | Higgins et al. | 428/36 |
| 4,818,551 | 4/1989 | Stall et al. | 426/420 |
| 4,844,129 | 7/1989 | Bridgeford et al. | 138/118.1 |
| 5,230,933 | 7/1993 | Apfeld et al. | 428/34.8 |
| 5,358,784 | 10/1994 | Hammer et al. | 428/34.8 |
| 5,370,914 | 12/1994 | Hammer et al. | 428/34.8 |
| 5,419,962 | 5/1995 | Robertson et al. | 428/348 |
| 5,449,318 | 9/1995 | Halftown et al. | 452/50 |
| 5,480,691 | 1/1996 | Hammer et al. | 428/34.8 |

FOREIGN PATENT DOCUMENTS

| | | | |
|---|---|---|---|
| 0 180 207 | 5/1986 | European Pat. Off. | A22C 13/00 |
| 163227/1982 | 3/1984 | Japan | A22C 13/00 |
| 549161/4 | 11/1985 | Spain | A22B 13/00 |
| 96/07328 | 3/1996 | WIPO | A22C 13/00 |

*Primary Examiner*—Keith D. Hendricks
*Assistant Examiner*—Drew Becker
*Attorney, Agent, or Firm*—Marshall, O'Toole, Gerstein, Murray & Borun

[57] ABSTRACT

An improved shirring solution for cellulosic sausages casings and its method of use is provided comprising carboxymethylcellulose and polyethylene glycol.

23 Claims, No Drawings

SHIRRING SOLUTION FOR CELLULOSIC SAUSAGE CASINGS

FIELD OF THE INVENTION

The present invention relates generally to an improved shirring solution for cellulosic sausage casings which when applied to the casings allows for superior peeling of the cellulosic sausage casings, and which provides other additional benefits.

BACKGROUND OF THE INVENTION

The manufacture and use of sausage casings, particularly the regenerated cellulosic skinless variety used in hot dogs and frankfurters, is a well-known technology that has been used for 70 years. Typically, the casings are cold shirred, or compressed down to about one-one hundredth the normal length by well known compaction mechanisms.

The use of cellulosic sausage casings in preparing sausage involves multiple steps. First, the casing is coated, on its interior surface, with a shirring solution. Shirring solutions typically contain several components that act on the casing to provide easy peelability of the casing following meat processing. A typical shirring solution comprises water, oil, carboxymethylcellulose, a surfactant and a humectant such as propylene glycol or glycerine which functions to retard penetration of the solution into the casing. Upon application to the casing, the shirring solution penetrates into the casing, causing the water to be absorbed by the cellulose and leaving the carboxymethylcellulose, mineral oil and surfactant on the inner surface. As the water leaves the carboxymethylcellulose, it transforms the carboxymethylcellulose from a gel into a powder. Next, the casing is stuffed with meat. Upon stuffing with meat, the water in the meat rehydrates the carboxymethylcellulose back into a gel. This gelatinized carboxymethylcellulose prevents the meat from sticking to the casing. After processing the product in a hot smokehouse, the casings are peeled off the meat. It is therefore important to have a casing that peels easily and completely after the meat processing. Generally, the carboxymethylcellulose and other shirring solution components act as lubricants to promote easy peeling of the casing.

Recent developments in the sausage industry have exacerbated the occurrence of peeling problems and reinforced the need for improvements in peeling methods.

There are four general situations which may create peeling problems. First, casings may become hard to peel when meat packers firmly stuff the casings to eliminate air voids often present in poultry meats and to achieve smoother looking products. However, when the casing is stuffed too tight, with internal pressures exceeding 150 mm Hg, the casing becomes very hard to peel. To overcome this, casing manufacturers make different types of casings with different degrees of elasticity. However, this can be costly because it involves a great amount of testing to determine which casing will work. For example, a casing too elastic can be wrinkled under certain conditions, while a casing with too little elasticity will be very tight.

Second, when liquid smoke is used to cure products, it can affect the performance of the carboxymethylcellulose and thus make it hard to peel off the casing. Because liquid smokes can have a very low pH, such as between 2 and 3, they can affect the performance of the carboxymethylcellulose component of the shirring solution, by causing it to lose its ability to hydrolyze upon contact with water.

Third, the recent adoption of high density casings may create peeling problems. When porous casings are used, liquid smoke easily penetrates through the casing to the meat. The acid in the smoke coagulates the proteins and thus, enables a skin to form on the meat. Further, when porous casings are used, the water easily evaporates from the meat through the casing which coagulates and cooks the meat faster. However, when high density casings are used, they impede the penetration of liquid smoke to the meat and they further retard water evaporation from the meat through the casing. Thus, high density casings retard skin formation which may create peeling problems.

Fourth, increases in smokehouse temperatures and reduction in humidities to accelerate processing, and to achieve good color can cause the casing to dry out. When this happens, the casing loses its moisture barrier between the meat and the casing which results in the deactivation of the carboxymethylcellulose, and thus, poor peelability.

Shirring solutions and other coatings have been applied to both the interior and exterior of sausage casings as well as to the meat itself. These coatings are used to lubricate and moisturize the casing as well as to add peeling aids, wetting agents, solution emulsifying agents, humectants, and antimycotics. As one aspect of the shirring process, it is known that administration of a shirring solution to the casing interior provides various advantages during shirring and thereafter during removal of the casing from the cooked sausage by peeling. Administration of the internal shirring solution moisturizes the casing, allowing it to achieve final humidity and to avoid breakage and further allows for the addition of peeling and release agents to the interior of the casing. Moreover, the casing shrinks slightly (about 1% to 3%) upon being wetted by solution, with this shrinkage greatly reinforcing the internested cones formed during shirring and providing improved coherency to the shirred sticks.

One preferred material for shirring of cellulose food casings is white food grade mineral oil. Matecki, U.S. Pat. No. 2,983,949 outlines the use of White U.S. Mineral Oil of Saybolt viscosity 76° to 80° in the internal inflation air stream of the shirring machine. Other lubricants including cotton seed oil, soya oil, glycerine are also known for coating the inside surface of the casings. Oil is generally applied internally at a rate of from 10 to 50 mg per 100 square inches. Lubricating oil is also shown by Matecki to be applied to the external casing, both to lubricate the shirring rolls to prevent heat build up and to lubricate the casing to prevent damage during shirring and later stuffing with meat emulsion. Matecki, U.S. Pat. No. 3,097,393 specifies the use of White Mineral Oil, Saybolt viscosity 76° to 80° for external coating of casings with coverage onto the casing of between 0.002 grams to 0.013 grams per 6 inch casing length. Oil is thus generally applied externally at a rate of from about 20 to about 100 mg per 100 square inches.

Marbach, U.S. Pat. No. 3,110,058 discloses a typical system for spraying internal liquids. Marbach, U.S. Pat. No. 3,158,896 discloses a means of using a commercial force-fed lubricator to apply this mineral oil. Arnold, U.S. Pat. No. 3,222,192 discloses using water as the external lubricant for the shirring rolls, as well as for a means of increasing shirred stick moisture to the desired ratio of 17% to 18% by total weight of all components. Arnold also describes adding the moisture internally to the stick inside wall during shirring as an alternate method and adding surface active agents to increase wettability. Prior to this, casings were humidified externally in the packaged state as shown by U.S. Pat. Nos. 2,181,329; 2,794,544; 3,028,952 and 3,250,629.

Clement, U.S. Pat. No. 3,266,911 discloses the external oiling system describing mineral oil as the external lubricant. Bridgeford, U.S. Pat. No. 3,451,827 discloses a mandrel designed to internally spray coatings onto the casing inner walls during shirring using compressed air as the propellant and exhausting the excess air. Bridgeford also discloses the use of external lubricating oil. Suitable lubricating oils include but are not limited to mineral oil, vegetable oils and glycerols with various additives including lecithin and carboxymethylcellulose.

Martinek, U.S. Pat. No. 3,456,286 teaches a means for using Bridgeford's technology to tightly compact casing. Martinek, U.S. Pat. No. 3,462,794 also discloses a fluid applicator to apply external shirr moisture to the casing, coincident with internal addition. Michl, U.S. Pat. No. 3,594,856 also added external moisturizing to the casing, post-shirring. Voo, U.S. Pat. No. 3,616,489 discloses a system to spray the shirred stick internal bore after shirring. Rose, U.S. Pat. Nos. 3,818,947 and 3,834,920 disclose using a mineral oil coating inside (N.F. No. 9) along with a surfactant to more uniformly coat the mineral oil.

Chiu, U.S. Pat. No. 3,898,348 discloses that the shirring solution can serve as a peeling agent, moisturizing agent and shirrability enhancer. Chiu teaches the use of shirring solutions comprising mixtures of water soluble cellulose ethers such as carboxymethylcellulose (CMC), mineral oil, surfactants (preferably polysorbate surfactants available as Tween® (ICI Chemicals)), and water, with polyols such as glycerine, sorbitol, propylene glycol and triethylene glycol being used as humectants to retard the penetration of the spray into the casing. Shirr solutions were taught to preferably be applied at 25° C. temperature (i.e., ambient room temperature) and were said to be characterized by viscosities of 500 cps with a maximum of 1500 cps. It is theorized that if the shirring solution penetrates slowly, the casing does not experience shrinkage while it is on the shirring machine. As a result, the tendency of the casings to seize the mandrel is reduced and the products can be manually transferred and manipulated on the shirring machine. Chiu shows that reducing the humectant (i.e. propylene glycol) in the shirring solution allows faster water penetration increasing the rate of casing shrinkage and thus affecting the ability to slide the casing on the mandrel. However, if too much humectant is used, dimensional change can occur for several days after shirring in a relatively uncontrolled state resulting in excessive and undesirable dimensional change.

Chiu, U.S. Pat. No. 3,981,046 discloses the use of propylene glycol as a humectant to reduce the rate of water imbibition by the casing where the moisture of the final casing was produced in excess of 17%. The propylene glycol is used as a humectant to bind the water to slow down penetration of the water into the casing. Alternate humectants listed include polyethylene glycol (Union Carbide Carbowax 400) and glycerine. The patent does not discuss peelability.

Propylene glycol is a humectant often used in shirring solutions. It has a molecular weight of 76, a density of 1.036 g/cm$^3$, and a boiling point of 188.2° C. Like glycerine, propylene glycol is used in the casing to prevent water loss. However, due to its lower boiling point, it is expected that propylene glycol will volatilize easier under smokehouse conditions and, as such, will release more water. However, despite having a lower boiling point than glycerine, propylene glycol has a lower vapor pressure, at 60° C. of 120 mm Hg. Thus, propylene glycol will boil off less at smokehouse temperatures of 60° C. to 90° C.

Glycerine, which is also used as a humectant in shirring solutions has a molecular weight of 92, a boiling point of 290° C., and a density is 1.26 g/cm$^3$. Like propylene glycol, glycerine is used in the casing to prevent water loss. Because of its high binding power with water, glycerine prevents water from boiling off the casing during the smokehouse operation. It has a vapor pressure at 60° C. of 208 mm Hg, versus water at 60° C. of 276 mm Hg. These high vapor pressures relative to polyethylene glycol with a vapor pressure of less than 10 mm Hg at 60° C., show that both water and glycerine will boil easily in hot environments, whereas polyethylene will not.

Developments in the art since Chiu U.S. Pat. No. 3,981,046 have resulted in a reduction of the quantity of propylene glycol added during shirring. While a 60% propylene glycol concentration in the shirr spray was typical at the time of Chiu, propylene glycol concentrations have more recently dropped to about 10% while other methodologies have been introduced to allow the sticks to be transferred easily without the retardation of water. It is known in the art that when levels of propylene glycol are reduced, it becomes more difficult to remove the shirred stick from the mandrel after compression due to the shrinkage exerted by the stick onto the mandrel. The casing can be damaged and the mandrel itself can bend and be damaged. Forces of several hundred pounds are not uncommon for stripping the shirred stick. Accordingly, it is now common to use very smooth surfaces such as those coated with Teflon® non-stick coatings to allow easier removal typically as disclosed in U.S. Pat. No. 3,097,393. Nevertheless, smooth coatings are difficult to use and still cause flattening of pleats and result in the radial reduction of the bore of the shirred stick. It is also known to taper the mandrel diameter toward the end of travel to alleviate the pressure. This can result in a smaller than desired stick bore (inner diameter) and often causes non-uniformity of stick inner and outer diameters.

Much effort in the art has been directed to alternative methods for improving the coherency of shirred casings. Winokur, U.S. Pat. Nos. 3,695,901 and 3,909,882 disclose methods for providing higher coherency by indenting the stick outer diameter with grooves. Rasbach, U.S. Pat. No. 3,798,301 discloses passing the shirred stick through a heated annular orifice to increase stick coherency.

Various other shirring solutions have also been used in an attempt to improve the coherency of shirred casings. Schutt and Stall, EPO 0180207 disclose a coating for cellulosic casings that is a mixture of anionic water-soluble cellulose ether, a non-ionic water-soluble cellulose ether, such as methylcellulose, and a lubricant such as propylene glycol.

Schultze et al., PCT WO96/07328 disclose humidifying cellulose casings either prior to shirring or during shirring. The casings are first treated with a plasticizing material such as glycerin. Next, they are treated with a lubricating material, such as mineral oil, an aqueous solution of cellulose ether, as well as an emulsifier.

Wilson, U.S. Pat. No. 4,062,980 discloses using sorbitan trioleate and glycerol monooleate as surfactants of the humidification fluid. Bridgeford in U.S. Pat. Nos. 4,062,981 and 4,137,947 describe use of sorbitan trioleate as a lubricating surfactant for the shirring spray, providing wettability and anti-jamming properties, yet achieving 14% to 20% shirred stick moisture. The method also reduces post-doffing stick expansion.

Hammer, U.S. Pat. No. 4,248,900 describes applying the release agents prior to shirring, winding the casing up, and then later shirring. Bridgeford et al., U.S. Pat. No. 4,844,129 disclose the use of polydextrose additives, along with a cellulose ether such as carboxymethylcellulose, plasticizers, lubricants, and a partial fatty acid ester of sorbitan or mannitan such as sorbitan trioleate to reduce pleat locking which is created when the carboxymethylcellulose dries out (resulting in shirred pleats sticking and not deshirring).

Hammer, U.S. Pat. No. 4,543,282 describes application of the shirring spray at ambient temperature, that is between 15° C. and 30° C., using various combinations of waxes, silicone oils and cellulose ethers. Alternate mixtures by Hammer are shown in U.S. Pat. No. 4,563,376. Higgins, U.S. Pat. No. 4,596,727 provides shirring solutions using Mazol 80 MG as a surfactant but maintaining propylene glycol at 22.5% to 49.0% in solution with final shirred stick moisture contents of 17% to 19.3%.

Coatings have been applied to the meat itself to prevent it from adhering to casing walls. It has been shown that meat, has release characteristics when coated with ethyl celluloses as shown in U.S. Pat. No. 2,840,474 or acetylated monoglycerides, as shown in U.S. Pat. No. 2,982,660. U.S. Pat. No. 2,709,138 illustrates early attempts to prevent sausages from adhering to casing walls. Other patents that show the application of coatings on the meat include U.S. Pat. Nos. 2,866,710, 2,873,715, and 3,158,488.

Various coatings have been applied to the casings to aid in peelability. For example, U.S. Pat. Nos. 3,307,956, 3,558,331, and 3,442,663 showed release coatings such as organosiloxane and silicones. Turbak et al., U.S. Pat. No. 3,753,740, disclose using high molecular weight water-soluble or dispersible internal coatings such as fluorocarbon compounds.

Bridgeford, in U.S. Pat. No. 4,489,114 discloses the combination of arabinogalactans with cellulose ether to improve peelability by improving resistance to gluing of the pleats due to the cellulose ethers on the interior side. Hutschenreuter, U.S. Pat. No. 4,528,225 describes peeling systems of oils, cellulose ethers and chemical starches. U.S. Pat. Nos. 3,653,928, 3,658,560, 3,658,561 and 3,674,511 disclose treating casings with salts, chelates, complexes of iron, aluminum, calcium, or magnesium, such as ferric ammonium citrate and aluminum sulfate prior to shirring to aid peelability.

Stall et al., U.S. Pat. No. 4,818,551 disclose a shirring solution composed of water, mineral oil, an emulsifier, and carboxymethylcellulose as a peeling agent. Apfeld et al., U.S. Pat. No. 5,230,933 provide an acid resistant peeling aid composition. This composition is a mixture of a water-soluble cellulose ether, such as carboxymethylcellulose, lecithin, an anti-pleat lock agent, such as an oil, and a surfactant. Other ingredients, such as humectants, antimycotics, lubricants, and antioxidants may also be used. Hammer et al., U.S. Pat. Nos. 5,358,784 and 5,370,914 describe using internal coatings of lecithin, along with alginates, chitosans or caseins to improve peelability. Hammer et al., U.S. Pat. No. 5,480,691 disclose using polytetrafluoroethylene in a coating solution, along with lecithin, oil, polysorbate, a wheat protein, water, propane-1,2-diol, and polyethyleneglycol monoalkyl ether. Michelena et al., Spanish patent application 549.161/4 shows a casing coating that is made of water, glycerol, carboxymethylcellulose, polyvinylpyrolidone, and vinyl acetate.

Most of the coatings described above have been used with limited success. It therefore remains a desire in the art to provide an improved shirring solution for cellulosic sausage casings and its method of application which enables the casings to be easily peelable, that is extremely soluble, easy to emulsify, retains clarity after being applied to the casing, and resists pleat gluing.

There also remains a desire in the art to provide an improved shirring solution for cellulose sausage casings that creates sticks that are strong, rigid, coherent, and exhibit low rebound growth after being compressed during shirring.

It further remains a desire in the art to provide an improved solution to retain the desired properties discussed above when used on both porous and non-porous casings, when liquid smokes are used during processing, and when processing occurs at increased temperatures and reduced humidities.

SUMMARY OF THE INVENTION

The invention provides an improved shirring solution for cellulosic sausage casing comprising both carboxymethylcellulose and polyethylene glycol, which creates superior peelability of cellulosic sausage casings.

Preferred shirring solutions of the invention comprise carboxymethylcellulose and polyethylene glycol in combination with polysorbate, sorbitan oleate, methylcellulose, lecithin, and mineral oil.

According to a preferred aspect of the present invention, the shirring solution contains from 1% to 3% by weight carboxymethylcellulose with about 2% by weight being preferred and from 8% to 13% by weight polyethylene glycol with 10% to 12% being preferred. Preferred carboxymethylcelluloses for use according to the invention are characterized by a low sodium content from 7% to 9% by weight, and a degree of substitution of 0.65 to 0.90. Preferred polyethylene glycols for use according to the invention are characterized by a molecular weight from about 200 to 1450 with a molecular weight of about 600 being particularly preferred. The polyethylene glycol of this solution provides a surface coverage of 1.5 mg/100 cm$^2$ to 20 mg/100 cm$^2$ with a preferred surface coverage of about 2.5 mg/100 cm$^2$ to 5 mg/100 cm$^2$, while the carboxymethylcellulose of this solution provides a surface coverage of 0.2 mg/100 cm$^2$ to 1 mg/100 cm$^2$ with a preferred surface coverage of about 0.6 mg/100 cm$^2$.

According to the method, the shirring solution containing both carboxymethylcellulose and polyethylene glycol is applied to the interior surface of the casing. Next, the casing is stuffed with meat. After stuffing, the casing and meat are processed. Finally, following processing, the casing is peeled off the meat.

DETAILED DESCRIPTION OF THE INVENTION

The present invention provides an improved shirring solution for cellulosic sausage casings that improves peelability of casings from processed sausage. The shirring solution contains both carboxymethylcellulose and polyethylene glycol, and optionally contains other components such as methylcellulose, polysorbate, sorbitan oleate, lecithin, and mineral oil. The shirring solution of the present invention works with casings of various densities, porosities and elasticities as well as under a variety of processing conditions. In particular, the present invention improves peelability, where peelability has become a problem because of recent developments and changes in sausage processing in the industry.

For example, it has become the trend in the sausage industry to pack casings tightly with meat to eliminate air voids and to achieve smoother looking products. However, when traditional shirring solutions are used in this situation, casings are very hard to peel after processing. The shirring solution of the present invention still provides excellent peelability of the casings when used in tightly packed casings,.

Another recent trend in the sausage industry is to use liquid smoke to cure the products. However, when typical shirring solutions are used, the low pH of the liquid smoke, often affects the performance of these shirring solutions and thus, poor peelability of the casings results. The shirring solution of the present invention creates excellent peelability even in the presence of liquid smokes.

It has also become a trend to process sausages in increased temperatures and reduced humidities. Unfortunately, when typical shirring solutions are used in this process, poor peelability results. However, when the shirring solution of the present invention is used under these processing conditions, it still provides excellent peelability of the casings.

It has also been found that the improved shirring solution of this invention is extremely effective on a porous casing. Porosity can be measured by gel swell, which is a measure of moisture pickup by a cellulose casing. Gel swell is the ratio of the weight of (casing+glycerine+water) to (casing+glycerine). Normally, casings have gel swells of 120% to 130%. The casing used in this test had gel swells of 150%. This indicates that the casing porosity is quite high, which is desireable when attempting to get skin formation and color development on a frankfurter but is undesirable because of excessive water loss in dry smokehouses. The use of the high molecular weight polyethylene glycol (PEG 600) blocks pores which physically prevents water loss. Although the mineral oil has a molecular weight of 350, and it penetrates substantially into a porous casing, the small quantity of mineral oil added is insufficient to block pores. Thus, the polyethylene glycol (PEG 600), which is a much larger molecule, at 600 molecular weight, will penetrate less into the casing as well as provide a moisture retardant wax film that prevents water from the sausage evaporating excessively through the casing.

According to one embodiment, the shirring solution has the following composition by weight: water, 81.7%; polysorbate, 0.25%; sorbitan oleate, 0.14%; carboxymethylcellulose, 2.11%; methylcellulose, 0.96%; lecithin, 0.48%; polyethylene glycol, 10.47%; and mineral oil, 4%.

The shirring solution of the present invention is very effective because of the use of polyethylene glycol as a humectant, instead of glycerine or propylene glycol which are often used as humectants in shirring solutions. PEG 600, available commercially from Union Carbide Corporation, in Danbury, Conn. as Carbowax® Sentry 600 (polyethylene glycol), is a very high molecular weight product, approximately 600 average molecular weight. Preferred polyethylene glycols use according to the invention are characterized by a molecular weight from about 200 to 1450 with a molecular weight of about 600 being particularly preferred. The polyethylene glycol of this solution provides a surface coverage of 1.5 mg/100 cm$^2$ to 20 mg/100 cm$^2$ with a preferred surface coverage of about 2.5 mg/100 cm$^2$ to 5 mg/100 cm$^2$ Polyethylene glycol has a density of 1.15 g/cm$^3$ at room temperature, a flash point of about 200° C., and several other unique attributes. For example, polyethylene glycol 600 is a wax at room temperature. Thus, a small wax coating is applied to the inside of the casing. Further, due to its high molecular weight, polyethylene glycol remains at the inner surface of the casing, thereby creating more impediments to boiling off during smoking processes. In addition, polyethylene glycol possesses barrier properties that block the water from leaving the sausage and, thus, maintains the water at the casing inner surface and in the casing itself. Further, polyethylene glycol has a higher water binding ability at elevated temperatures than glycerine or propylene glycol. Therefore, because polyethylene glycol stays at or near the casing surface because of its high molecular weight, it maintains moisture on the inner surface of the casing to activate the carboxymethylcellulose. Polyethylene glycol also has a lower hygroscopic binding than glycerine which slows down the passage of water from the meat, through the polyethylene glycol (Carbowax®), through the casing and into the ambient air, but is more stable at higher temperatures. Finally, polyethylene glycol has a very low vapor pressure at 60° C. of less than 10 mm Hg pressure and thus, does not boil at temperatures above 200° C., although it decomposes at this temperature. Therefore, polyethylene glycol characterized by a molecular weight of 600 (PEG 600) offers high temperature stability.

Because of polyethylene glycol's unique attributes, the use of polyethylene glycol in the shirring solution provides many additional benefits. First, its use provides excellent solution stability and the shirring solution is easy to emulsify. In addition, its use provides good clarity of the solution applied to casing. Moreover, the wax coating helps resist pleat gluing and the sticks become very strong, rigid, and coherent. Finally, the stick rebound growth, after being compressed during shirring, is low.

The carboxymethylcellulose preferred for use according to the invention provides a surface coverage of 0.2 mg/100 cm$^2$ to 1 mg/100 cm$^2$ with a preferred surface coverage of about 0.6 mg/100 cm$^2$ and is further characterized by a low sodium content from 7% to 9% by weight, and a degree of substitution of 0.65 to 0.90. The degree of substitution refers to the number of hydroxyl groups substituted with carboxymethyl groups in each anhydroglucose unit per total hydroxyl groups. Because each anhydroglucose unit has three hydroxyl groups, the maximum substitution is three. Because the carboxymethylcellulose contains sodium, it can also be referred to as sodium carboxymethylcellulose. A low viscosity carboxymethylcellulose, such as CMC-7LF®, is preferred which is manufactured by Hercules Chemical under the name Aqualon®. This grade of carboxymethylcellulose has a degree of polymerization of around 400 and is characterized by a molecular weight from about 70,000 to 120,000 with a molecular weight of about 90,000 being particularly preferred. This carboxymethylcellulose is preferred because it provides a final emulsion viscosity under 100 cps. A viscosity above this, makes it difficult to spray the shirring solution.

The shirring solution of the present invention also preferably contains surfactants such as polysorbate 80 (Tween® 80) which has a hydrophillic-lipophile balance (HLB) of 15. It is an excellent anti-pleat gluing agent but must be used in high quantities which consequently greatly retards stick coherency. It is therefore used only as a wetting agent, satisfactory with its high hydrophillic-lipophile balance, and is modified with the addition of sorbitan oleate (Span® 80), with a hydrophillic-lipophile balance 4.3, to give a weighted average hydrophillic-lipophile balance of between 8 to 11. This weighted average hydrophillic-lipophile balance has been found to provide an ideal balance of properties. A low hydrophilic-lipophile balance provides excellent lubricity of shirring solutions, but also poor emulsion stability of shirring solutions. Shirring solutions tend to be oil in water emulsions, which have better solution stability with higher hydrophillic-lipophile balances. High hydrophillic-lipophile balances are excellent emulsifiers and good wetting agents, but will not create lubricity of the mineral oil. Therefore, a two component surfactant is used to modify the hydrophillic-lipophile balance to the best range, to allow the mineral oil to lubricate and to provide emulsion stability and wetting. These surfactants are manufactured by ICI Surfactants, but have generic substitutes.

A methylcellulose useful according to the invention is Methocel® (Dow Chemical). Methylcellulose is nonionic so, unlike carboxymethylcellulose, it has no negative charge to which the H+ ion from any acid present could attach to and begin molecular decomposition. Thus, methylcellulose is a good additive for carboxymethylcellulose, because it is compatible and as an emulsifier, it helps carboxymethylcellulose disperse well. A particularly preferred methylcellulose is Methocel® E15FG, a hydroxypropylmethylcellulose. In addition to acid tolerance, methylcellulose is soluble in solution at low temperatures but will gel at high temperatures. Therefore, it is theorized that during the heating stage in a smokehouse, the methylcellulose provides some gelation, creating a film which, by swelling into a gel, helps break the high pressure contact of the casing to the meat. Once this high pressure contact is broken, when temperatures cool, the carboxymethylcellulose can now also turn into a gel, allowing enhanced peeling. Therefore, one has a nonionic and ionic binary peeling system. Benecel® M-043, a straight methylcellulose provided by Hercules Aqualon can also be used.

Lecithin is a lubricant, and helps prevent pleat gluing. A sprayable, low viscosity Lecithin is needed. Acceptable lecithins include Central Soya Centrophil® W, Centrophil® NV, and Centrolex® F. Various experiments can be found to optimize pleat gluing, lubricity and stick integrity.

The mineral oil used is a white mineral oil, typical 90 SSU, manufactured by Witco under the trade name Blandol® 9 NF.

EXAMPLE 1

A shirring solution was prepared according to the invention with the following compositions and properties:

| Ingredient | Shirring Solution Composition (wt. %) | Casing Composition (wt. %) | Combined Shirring Solution and Casing Composition (wt. %) | Surface Coverage (mg/ 100 cm$^2$) |
|---|---|---|---|---|
| Water- Shirring Spray (Deionized) | 81.7 | 0 | 18.7 | 0 |
| Polysorbate (Tween ® 80) | 0.25 | 0 | 0.019 | 0.080 |
| Sorbitan Oleate (Span ® 80) | 0.14 | 0 | 0.011 | 0.046 |
| Carboxymethy- cellulose (CMC-7LF ®) | 1.92 | 0 | 0.145 | 0.61 |
| Methylcellulose (Methocel ®) | 0.20 | 0 | 0.018 | 0.07 |
| Lecithin (Centrolex ® F Lecithin) | 0.20 | 0 | 0.019 | 0.078 |
| Polyethylene Glycol (PEG 600) | 11.62 | 0 | 0.88 | 3.7 |
| Internal | 4.00 | 0 | 0.77 | 3.24 |
| Mineral Oil (Mineral Oil 90 SSU) | | | | |
| Mineral Oil (External Mineral Oil) | 0 | 0 | 2.2 | 9.3 |
| Cellulose | 0 | 73.7 | 66.2 | 0 |
| Glycerine | 0 | 12.3 | 10.9 | 0 |
| Real Stock Moisture | 0 | 14.0 | 12.6 | 0 |

The solution was applied to the interior surface of the casing, typical caliber 27 casing (flatwidth is 36 mm, bone dry gauge alpha cellulose is 2.02 g/meter), at a coverage rate of 33.8 mg per 100 square cm.

The casings were peeled using a Ranger Appollo Peeler, and peeled perfectly.

EXAMPLE 2

A control and a test shirring solution were prepared with the following compositions:

| Ingredient | Control Composition (wt. %) | Test Composition (wt. %) |
|---|---|---|
| Water (Deionized) | 81.7 | 81.7 |
| Polysorbate (Tween ® 80) | 0.34 | 0.34 |
| Sorbitan Oleate (Span ® 80) | 0.19 | 0.19 |
| Carboxymethylcellulose (CMC-7LF ®) | 2.11 | 2.11 |
| Methylcellulose (Methocel ® E5) | 0 | 0.96 |
| Lecithin (Centrophil W Lecithin ®) | 1.92 | 1.92 |
| Propylene Glycol | 9.74 | 0 |
| Polyethylene Glycol | 0 | 8.76 |
| Mineral Oil (Mineral Oil 90 SSU) | 4.00 | 4.00 |

A matrix test was run, on caliber 27×115, using all-beef emulsions, using Townsend RT7 FAM's with a $^{16}/_{32}$ inch horn. The product was stuffed to 26.1 mm diameter, producing 5¼ inch links with a 5½ inch linker target. The smokehouse schedule was as follows:

| Zone | Temperature (°F.) | Relative Humidity | Time (minutes) |
|---|---|---|---|
| 1 | 160 | 20% RH | 55 |
| 2 | 180 | 0% RH | 60 |
| 3 | 180 | 62% RH | 10 |
| 4 | water shower | | 20 |
| 5 | brine chill | | 10 |

The product exited at 27° F. from the brine chill and was sprayed with water.

The casing which had the control composition applied to it peeled poorly, was very tacky, and had many misses and skips. It was rated at less than 90% peelability, which is inadequate to commercialize. The casing, which had the test composition applied to it, peeled perfectly. Both were applied to Alfacel Caliber 27 casing, at rates of 33.8 mg per 100 sq cm casing surface area.

Prior to this, tested shirring solutions that did not contain methylcellulose (Methocel® E5) and lecithin (Centrophil® W Lecithin) showed even poorer peeling. Therefore, the methylcellulose and lecithin were included in the shirring solutions to attempt to improve peelability.

EXAMPLE 3

A control and a test shirring solution were prepared with the following compositions:

| Ingredient | Control Composition (wt. %) | Test Composition (wt. %) |
| --- | --- | --- |
| Water | 85 | 85 |
| Polysorbate (Tween ® 80) | 0.26 | 0.26 |
| Sorbitan Oleate (Span ® 80) | 0.15 | 0.15 |
| Carboxymethylcellulose | 2.00 | 2.00 |
| Lecithin (Lecithin ® F) | 0.25 | 0.25 |
| Polyethylene Glycol (PEG 600) | 0 | 12.34 |
| Propylene Glycol (PG 600) | 12.34 | 0 |

These solutions were applied to the shirring mandrel at a rate of 30.6 mg/100 cm$^2$ of casing and were combined prior to the mandrel with mineral oil at the rate of 3.24 mg/100 cm$^2$, giving total solution coating of 33.8 mg/100 cm$^2$.

Both products were shirred on a size 21 caliber Alfacel casing. The freshly shirred product was heated at 110° C. for 2 hours in an oven. At the end of 2 hours, the product treated with the control shirring solution had a moisture of 0.6%, water to total weight. The casing was brittle, dry and broke easily. The product treated with the shirring solution of the invention (the test composition) had a moisture of 3.5%. Although this was low, the casing did not break easily and had strength. The shirring solution containing polyethylene glycol and carboxymethylcellulose retained moisture better and provided better strength properties than the propylene glycol-based solution. Therefore, polyethylene glycol (PEG 600) is an effective humectant offering improved peelability, excellent stick coherency, good sprayability as well as being a synergistic enhancer on a porous casing.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A shirring solution for cellulosic sausage casings comprising carboxymethylcellulose and polyethylene glycol wherein the polyethylene glycol is characterized by an average molecular weight of from 200 to 1450.

2. The shirring solution of claim 1 wherein the shirring solution comprises from 1% to 3% by weight carboxymethylcellulose.

3. The shirring solution of claim 1 wherein the shirring solution comprises from 8% to 13% by weight polyethylene glycol.

4. The shirring solution of claim 1 wherein the shirring solution comprises about 2% by weight carboxymethylcellulose.

5. The shirring solution of claim 1 wherein the shirring solution comprises 10% to 12% by weight polyethylene glycol.

6. The shirring solution of claim 1 wherein the polyethylene glycol is characterized by an average molecular weight of about 600.

7. The shirring solution of claim 1 wherein the carboxymethylcellulose is characterized by a sodium content of 7% to 9% by weight, and a degree of substitution of 0.65 to 0.90.

8. The shirring solution of claim 1 wherein the carboxymethylcellulose is characterized by an average molecular weight of from 70,000 to 120,000.

9. The shirring solution of claim 1 wherein the carboxymethylcellulose is characterized by an average molecular weight of about 90,000.

10. A shirring solution for cellulosic sausage casings comprising from 1% to 3% by weight carboxymethylcellulose and from 8% to 13% by weight polyethylene glycol wherein the polyethylene glycol is characterized by an average molecular weight of 200–1450.

11. A method of producing sausage comprising
applying a shirring solution to the interior surface of a cellulosic sausage casing wherein the shirring solution comprises carboxymethylcellulose and polyethylene glycol said polyethylene glycol being characterized by an average molecular weight of from 200 to 1450;
stuffing the cellulosic sausage casings with meat;
processing the cellulosic sausage casing and meat; and
peeling the cellulosic sausage casing off the processed meat.

12. The method of claim 11 wherein the shirring solution comprises from 1% to 3% by weight carboxymethylcellulose.

13. The method of claim 11 wherein the shirring solution comprises from 8% to 13% by weight polyethylene glycol.

14. The method of claim 11 wherein the shirring solution comprises about 2% by weight carboxymethylcellulose.

15. The method of claim 11 wherein the shirring solution comprises 10% to 12% by weight polyethylene glycol.

16. The method of claim 11 wherein the carboxymethylcellulose provides a surface coverage of 0.2 mg/100 cm$^2$ to 1 mg/100 cm$^2$.

17. The method of claim 11 wherein the carboxymethylcellulose provides a surface coverage of 0.6 mg/100 cm$^2$.

18. The method of claim 11 wherein the polyethylene glycol provides a surface coverage of 1.5 mg/100 cm$^2$ to 20 mg/100 cm$^2$.

19. The method of claim 11 wherein the polyethylene glycol provides a surface coverage of 2.5 mg/100 cm$^2$ to 5 mg/100 cm$^2$.

20. The method of claim 11 wherein the polyethylene glycol is characterized by an average molecular weight of about 600.

21. The method of claim 11 wherein the carboxymethylcellulose is characterized by a sodium content of 7% to 9% by weight, and a degree of substitution of 0.65 to 0.9.

22. The method of claim 11 wherein the carboxymethylcellulose is characterized by an average molecular weight of from 70,000 to 120,000.

23. The method of claim 11 wherein the carboxymethylcellulose is characterized by an average molecular weight of about 90,000.

* * * * *